United States Patent Office 3,410,616
Patented Nov. 12, 1968

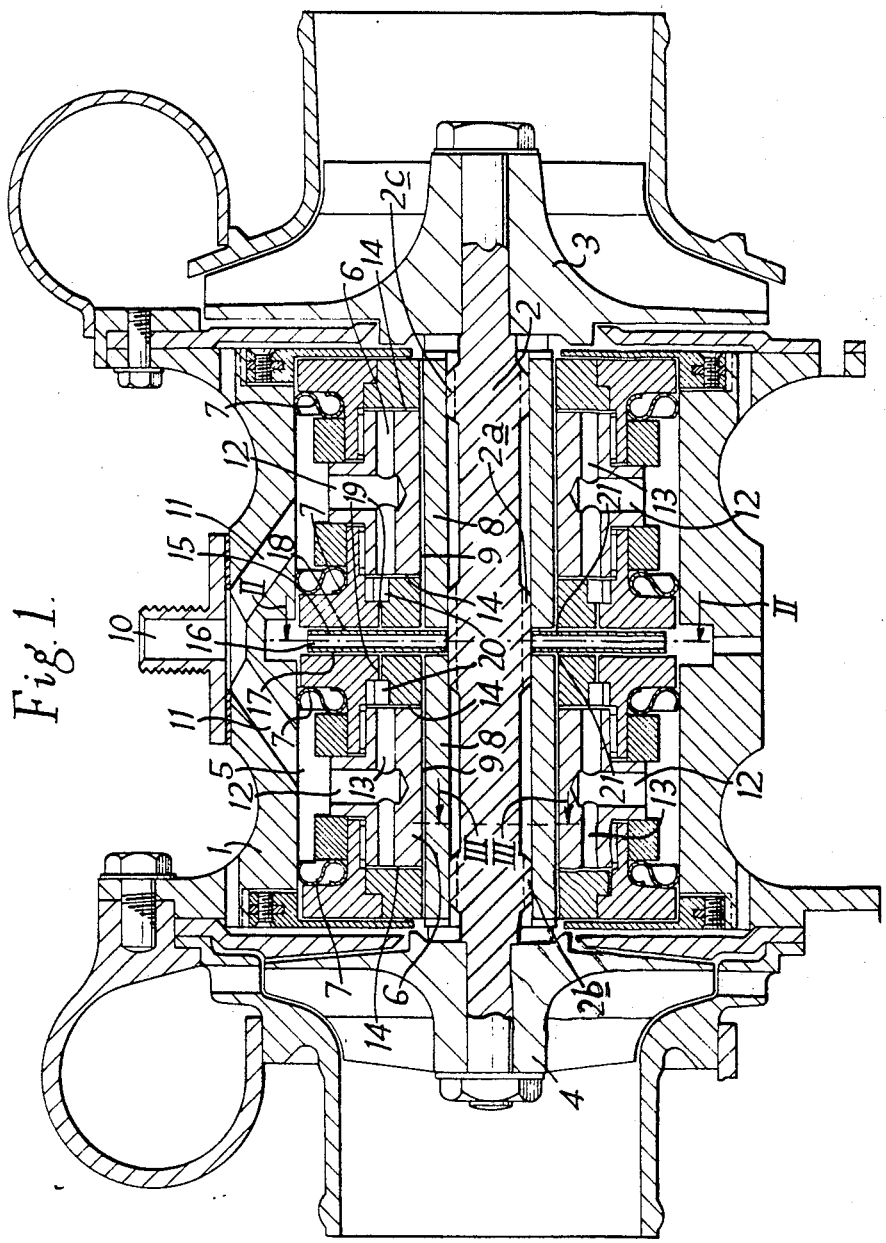

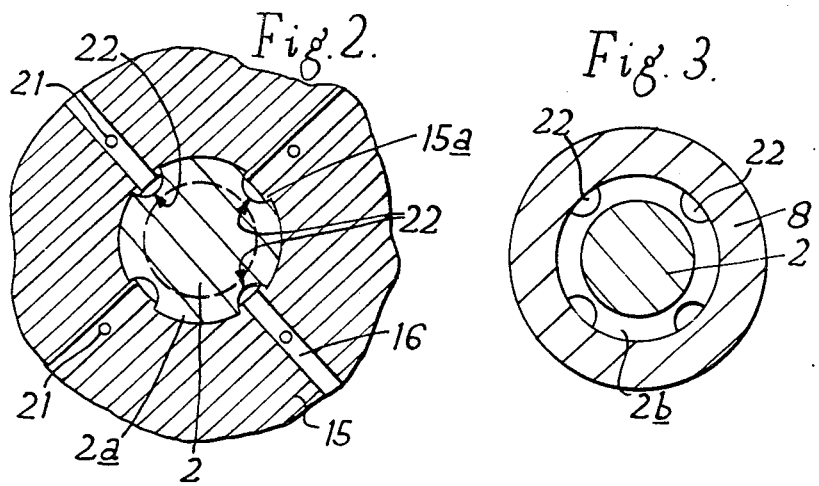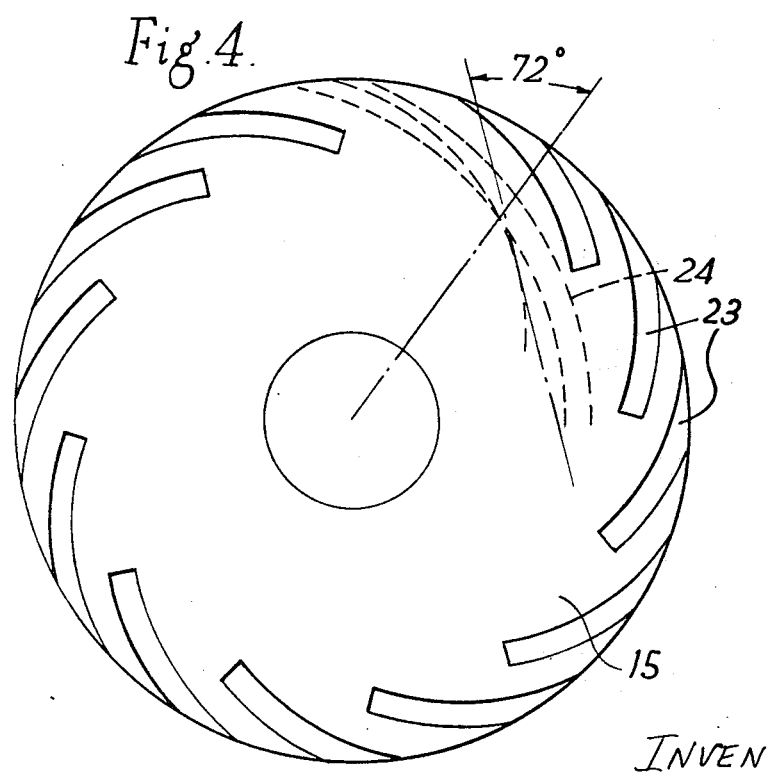

3,410,616
GAS BEARING
William Colin Dee, Bournemouth, England, assignor to Gilbert C. Davis, Johannesburg, Transvaal, Republic of South Africa
Filed June 17, 1966, Ser. No. 560,374
Claims priority, application Great Britain, June 25, 1965, 26,988/65
5 Claims. (Cl. 308—9)

ABSTRACT OF THE DISCLOSURE

There is disclosed a rotary device comprising a stator structure, stator bearing means disposed within said stator structure, means resiliently mounting said stator bearing means within said stator structure such that said stator bearing means are radially movable within limits with respect to said stator structure, and a rotor disposed within said stator bearing means and defining therewith two axially spaced journal gas bearing gaps and two axially spaced axial thrust gas bearing gaps, said rotor including a thrust member having two axially opposed faces each of which defines a respective axial thrust bearing gap with a respective stator bearing means, said two axial thrust bearing gaps being disposed axially between said two axially spaced journal bearing gaps, said thrust member including an exhaust path for bearing gas from each journal bearing gap.

---

This invention relates generally to gas bearings, and is specifically concerned with increasing the stability of very high speed air turbine rotors and with the suppression of undesirable vibration and whirl effects which occur at certain speeds in the range through which the rotor can operate.

One such effect is that known in the art as "half speed whirl" and occurs in devices having a rotor carried by gas bearings when a certain critical speed is approached at which the wedge of compressed gas which serves to support the rotor commences to travel with the rotor and to circulate round the bearing axis at a speed which is half that of the rotor itself. The effect decreases and disappears rapidly as the speed of the rotor continues to increase during run-up, but whilst the effect persists the movements of the rotor may be very erratic and it may be caused to come into surface-to-surface contact with its bearing means, with a risk of immediate seizure.

Another effect which can occur in devices including gas bearings and operated at very high speeds, say of the order of 50,000 r.p.m. to 150,000 r.p.m. and above, is that of irregular movement of the rotor involving inclination of its axis with respect to the axis of the bearing means, the two ends of the axis of the rotor describing circles about the axis of the bearing means.

The object of the present invention is to provide an improved construction of device including gas bearings whereby both of these undesirable effects are suppressed to the extent that even relatively massive rotors may be operated to higher speeds than was possible hitherto.

According to the present invention a rotary device, such as for example a turbine driven by compressed air or other gas, comprises a stator structure, stator bearing means resiliently mounted in said structure so as to be movable within limits radially of the axis of the bearing means, and a rotor supported in said bearing stator means by two axially spaced journal gas bearings and two axially spaced thrust gas bearings.

With such an arrangement, the presence of the resilient mounting for the bearing means enables the bearing means to move radially within limits so as to avoid surface-to-surface contact by the rotor when any eccentric movement occurs, e.g. as a result of erratic movements imposed on it by the rotor and gas wedge, whilst the carrying of the rotor by two axially spaced journal gas bearings and by two axially spaced thrust bearings eliminates or very much reduces the possibility of the rotor carrying out any motion other than simple rotation about the axis of the bearing means.

It is preferred that each journal gas bearing shall incorporate a respective stator member which is independently resiliently mounted in the stator structure. Each such stator member may be common to a respective journal gas bearing and to a respective axial thrust bearing.

The two axially spaced thrust bearings may be disposed between the two axially spaced journal bearings, and in a preferred embodiment the two axially spaced thrust bearings are provided one at each face of a common thrust member disposed between the journal bearings. Such an arrangement has the advantage that equal and opposite axially-directed thrusts are exerted on the common thrust member, so that bending of that member under stress is eliminated.

Where journal gas bearings and axial thrust gas bearings are both illustrated in the same rotary device, and are closely adjacent one to the other, it can occur that gas exhausting from the adjacent end of the journal bearings passes into the radial gap of the thrust bearings and interferes with the pattern of gas flow therein, to the detriment of the proper functioning of the thrust bearings. In order to overcome this disadvantage it is desirable to lead away the exhaust gas by some other path, and according to a further feature of the invention the common thrust member includes an exhaust path for bearing gas leaving an end of each journal bearing, e.g. a series of small axial holes in the thrust member leading from a position adjacent to the end of the respective journal bearing gap to an escape path within the thrust member. The exhausting of such gas may be improved by forming the thrust member as a centrifugal pump, e.g. by providing radial passages therein opening at its periphery, said passages communicating with the exhaust path. Cooling of the rotor may be facilitated by including in it a flow path, for cooling air, communicating with said radial passages, whereby the centrifugal pump draws a continuous stream of air through the rotor.

In order that the nature of the invention may be readily ascertained, an embodiment of device in accordance therewith is hereinafter particularly described with reference to the accompanying drawings, wherein:

FIG. 1 is an axial section of a "cold air unit," the function of which is explained below;

FIG. 2 is a partial radial section taken on the line II—II of FIG. 1;

FIG 3 is a partial radial section taken on the line III—III of FIG. 1;

FIG. 4 is an axial elevation of a thrust disc.

A device known in the art as a "cold air unit" consists essentially of a compressor and a turbine mounted one at each end of a rotor which is required to rotate at speeds of the order of up to 100,000 revolutions per minute. Hitherto, such units constructed with conventional ball bearings have had a relatively short life because of the use of ball bearings and the necessity to use lubricants therewith. A further limitation of the length of life of such units occurred by reason of the high operating temperatures involved.

To overcome the disadvantages of ball bearings, such units have already been constructed with gas bearings and whilst this has permitted an increase of the speed of rotation, the rotors of such units have been subject to the violent instabilities referred to above. This problem of instability has hitherto severely restricted the maximum operating speeds of such rotors.

Referring to FIG. 1, the cold air unit comprises a stator housing 1, and a rotor shaft 2 rotatable therein and carrying a turbine 3 at one end and a compressor 4 at the other end. Within the housing is provided a chamber 5 in which are disposed two axially spaced bearing stator assemblies each indicated generally by reference 6. Each stator assembly is mounted in its respective portion of the chamber 5 by means of a pair of resilient metal rings 7 of S-shaped cross-section. Between the inside diameter of each stator assembly and a respective one of a pair of sleeves 8 mounted on the rotor shaft there is formed a journal gas bearing gap 9. Compressed gas for feeding the journal bearing gaps 9 enters through a port 10 on the housing 1 and passes through channels 11 to the chamber 5. In each stator assembly there is provided a series of radial passages 12 communicating with longitudinal bores 13, and from the ends of the bores 13, very small radial slots 14 feed the gas to the bearing gaps 9. A method for the formation of these slots is described and claimed in British patent application No. 25,840/65 dated June 18, 1965, in the name of Aerostatic Limited.

Centrally on the rotor shaft 2 there is secured a thrust member 15 in which is a solid disc having a plurality of radial passages 16 opening at its circumference. Between the two major faces of the thrust disc 15 and the respective end faces of the two stator assemblies 6 there are defined respective axial thrust gas bearing gaps 17 and 18. Compressed gas to feed these axial thrust bearing gaps is derived from a circular slot 19 disposed about the axis of the shaft and communicating with annular supply channels 20 fed with compressed gas from the bores 13.

When the rotor is rotating, compressed gas exhausts from the ends of the two journal bearing gaps 9. At the two outer ends this gas escapes freely to atmosphere. At the two inner ends, adjacent to the thrust disc 15, unless some provision was made for exhausting it, such exhaust gas would tend to interfere with the gas flow of the adjacent axial thrust bearing gaps 17 and 18. To overcome this difficulty, the wall of the thrust disc 15 is apertured at 21 so that the gas can be exhausted through the radial passages 16 of the disc.

Because the thrust disc 15 is rotating at a very high speed, and has the radial passages 16, it acts as a centrifugal gas pump and creates a lowered pressure adjacent to its axis. This lowered pressure not only improves exhausting of the bearing gas, but also serves for drawing cooling air through the rotor. The rotor shaft 2 is formed with a central shoulder 2a and two end shoulders 2b and 2c each of which is of the same somewhat greater diameter than the remainder of the shaft. These shoulders are formed with four symmetrically spaced external longitudinal milled channels, parallel to the axis of the shaft, (see FIG. 3). When the sleeves 8 are forced onto the respective shoulders of the shaft, they define the passages 22. In the central shoulder 2a, the passages 22 communicate with the open inner end of the radial passages 16 of the thrust disc. Accordingly, as the rotor rotates, atmospheric air is drawn in through the passages 22 of the outer shoulders, flows along the periphery of the shaft 2 within the sleeves 8, then passes through the passages 22 of the central shoulder 2a, and reaches the radial passages 16 of the thrust disc, from which it is ejected at the circumference.

In order to obtain rotational keying of the thrust disc on the central shoulder 2a, the disc is formed with four radially inwards projecting noses 15a which seat into the four channels on the periphery of the shoulder, see FIG. 2.

In the unit illustrated, the rotating assembly is floated on a film of compressed gas such that two distinct sets of bearings are formed, i.e., two axially spaced journal bearings and two axially spaced axial thrust bearings, neither of which influences the other. A separate gas supply is made available to feed the bearings, as distinct from the air flow through the unit as a whole.

In order to obviate the problems of starting and stopping of the unit, i.e., at periods when rubbing contact might occur between the rotor and its bearing means, and also to overcome the danger of seizure at high speed if the rotor and its bearing means should happen to come into contact due to instability the rotating members are preferably made of a high grade stainless steel, such as those known under the trade names Sandvik or Hofors to Specification 440C, the stationary members of both the journal and the thrust bearings being made of ceramic silicon nitride. This material has great stability during manufacture, and is unaffected by temperature up to 1000° C. It has also an extremely low coefficient of friction. A particular advantage of the material is that it can readily be machined to shape whilst it is in an intermediate "green" state, and can thereafter be heat treated, without change of shape or dimensions, to a final state in which it is so hard that it can only be polished with a diamond lap or the equivalent.

The S section resilient rings 7, used for mounting the bearing stator assemblies, not only serve as a resilient mounting which overcomes problems of instability during run-up and run-down but also serve to seal the chamber 5 against escape of bearing gas fed in through channels 11.

Referring now to FIG. 4, which shows the thrust disc 15, the two major faces of the disc are each provided with arcuate grooves 23. An example of the known "Whipple Groove" 24 is indicated in broken line. As distinct from this known kind of groove, the grooves 23 are of greater radius, and terminate at their inner end at a greater radius from the axis of the disc. These grooves 23 enhance the stiffness of the axial thrust bearings at lower gas supply pressures.

I claim:

1. A rotary device comprising a stator structure, stator bearing means disposed within said stator structure, means resiliently mounting said stator bearing means within said stator structure such that said stator bearing means are radially movable within limits with respect to said stator structure, and a rotor disposed within said stator bearing means and defining therewith two axially spaced journal gas bearing gaps and two axially spaced axial thrust gas bearing gaps, said rotor including a thrust member having two axially opposed faces each of which defines a respective axial thrust bearing gap with a respective stator bearing means, said two axial thrust bearing gaps being disposed axially between said two axially spaced journal bearing gaps, said thrust member including an exhaust path for bearing gas separate of said thrust bearing gaps from each journal bearing gap.

2. A rotary device, as claimed in claim 1, wherein said exhaust path comprises in said thrust member a plurality of radial passages and apertures forming a communication between the adjacent end of each journal gas bearing gap and a respective one of said radial passages, whereby said thrust member acts as a centrifugal pump for exhausting a gas from the journal gas bearing gaps.

3. A rotary device, as claimed in claim 1, wherein each stator bearing means includes radial slots communicating with the respective journal gas bearing gap for feeding of pressurized bearing fluid to said gap.

4. A rotary device, as claimed in claim 1, wherein each stator bearing means is made of silicon nitride, the antigalling properties of which prevent seizure in the event of occurrence of high frequency vibration of the rotor within the stator bearing means.

5. A rotary device, as claimed in claim 1, wherein each of the two axially opposed faces of the thrust member includes short arcuate grooves extending inwardly from the periphery of said face at an angle less than 72° and terminating at a spacing from the axis of the said face, the grooves being so disposed in relation to the direction of rotation of the thrust member that they create by centripetal action a zone of increased gas pressure adjacent to the outer marginal portion of said face.

References Cited

UNITED STATES PATENTS 3,058,785 10/1962 Steele _____ 308—9
3,063,041 11/1962 Quade et al. _____ 308

OTHER REFERENCES

Air Lubricated Bearings, by Paul Mueller, published in Product Engineering—1953 Annual Handbook, pages J2–J5 relied upon.

MARTIN P. SCHWADRON, *Primary Examiner.*
FRANK SUSKO, *Assistant Examiner.*